US012111203B2

(12) United States Patent
Leonard et al.

(10) Patent No.: US 12,111,203 B2
(45) Date of Patent: Oct. 8, 2024

(54) AIRCRAFT LIFTING DEVICES WITH COUPLING ADAPTERS BETWEEN JACKS AND LOAD CELLS

(71) Applicant: Gulfstream Aerospace Corporation, Savannah, GA (US)

(72) Inventors: Patrick Leonard, Savannah, GA (US); Frank McDonough, Savannah, GA (US); Matthew Hansen, Savannah, GA (US); Paul Ashburn, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 834 days.

(21) Appl. No.: 17/248,256

(22) Filed: Jan. 15, 2021

(65) Prior Publication Data

US 2022/0228904 A1     Jul. 21, 2022

(51) Int. Cl.
*G01G 19/07* (2006.01)
*B64F 5/50* (2017.01)
(Continued)

(52) U.S. Cl.
CPC ............... *G01G 19/07* (2013.01); *B64F 5/50* (2017.01); *G01G 19/52* (2013.01); *B66F 3/00* (2013.01); *B66F 3/08* (2013.01)

(58) Field of Classification Search
CPC .......... G01G 19/07; G01G 19/52; B64F 5/50; B66F 3/08; B66F 3/00; B66F 3/46; B66F 13/00

(Continued)

(56) References Cited

U.S. PATENT DOCUMENTS 6,375,160 B1 * 4/2002 Hung ..................... B66F 5/00
                                                    254/133 R
2009/0234504 A1   9/2009 Mikowski et al.
(Continued)

FOREIGN PATENT DOCUMENTS

CN      202358873 U  *  8/2012
CN      103954340 A  *  7/2014
(Continued)

OTHER PUBLICATIONS

Translation CN-103954340 (Year: 2014).*
Translation CN-202358873 (Year: 2012).*
Translation RU-2265192 (Year: 2005).*

*Primary Examiner* — Octavia Hollington
*Assistant Examiner* — Monica S Young
(74) *Attorney, Agent, or Firm* — Lorenz & Kopf, LLP

(57) ABSTRACT

An aircraft lifting assembly includes a jack, a load cell, and a jack adapter. The jack includes an extendable arm having a distal end portion for exerting a force to lift an object. The distal end portion defines a cavity. The jack adapter couples the extendable arm to the load cell and includes a base portion, a cradle portion, and a projection. The base portion defines a jack arm support surface and a load cell support surface. The jack arm support surface opposes the distal end portion of the extendable arm and the load cell support surface opposes the load cell. The cradle portion extends from the base portion to circumscribe a portion of the load cell to secure the jack adapter to the load cell. The projection extends from the base portion into the cavity to secure the jack adapter to the extendable arm of the jack.

17 Claims, 4 Drawing Sheets

(51) Int. Cl.
*B66F 3/00* (2006.01)
*B66F 3/08* (2006.01)
*G01G 19/52* (2006.01)

(58) Field of Classification Search
USPC ........................................................ 73/65.05
See application file for complete search history.

(56) References Cited

U.S. PATENT DOCUMENTS

2014/0008133 A1* 1/2014 Chan ..................... G01G 3/14
  177/180
2020/0148521 A1* 5/2020 Leonard .................... B66F 7/28
2021/0009393 A1* 1/2021 Lane ....................... B66F 13/00

FOREIGN PATENT DOCUMENTS

| | | | | |
|---|---|---|---|---|
| CN | 105384106 A | | 3/2016 | |
| CN | 114623910 A | * | 6/2022 | |
| EP | 4159094 A1 | * | 4/2023 | ............. A47J 27/58 |
| JP | 2017046966 A | * | 3/2017 | |
| RU | 2265192 C1 | * | 11/2005 | |
| WO | WO-2008144913 A1 | * | 12/2008 | ............. B65D 19/38 |

* cited by examiner

AIRCRAFT LIFTING DEVICES WITH COUPLING ADAPTERS BETWEEN JACKS AND LOAD CELLS

TECHNICAL FIELD

The present disclosure relates generally to aircraft lifting devices and more particularly relates to aircraft lifting devices with projections adapted to jack arms and cradles adapted to load cells.

BACKGROUND

It is sometimes necessary to lift a parked aircraft off the ground for various inspection and maintenance tasks. For example, maintenance tasks that involve removing the aircraft wheels typically requires lifting the aircraft.

The process of lifting the aircraft with at least one lifting device or jack is known as jacking the aircraft. During the jacking process, it is desirable to measure the weight supported by each jack for various reasons. For example, it may be desirable to know the weight distribution between the port and starboard wings of the aircraft to know whether the aircraft is tilted. Accordingly, a scale or load cell is typically placed between the ground and the aircraft to measure the weight supported by each jack.

One solution for connecting the load cell to the jack assembly is to use a threaded adapter between the jack and the load cell. Such a threaded adapter, however, may unscrew and become loose due to vibrations through the jack assembly during the lifting operation. When the threaded adapter is loosely connected there may be considerable side loading on the jack, resulting in damage to the jack assembly or costly damage to the aircraft.

Accordingly, it is desirable to provide a jack assembly that reduces the risk of damage to the aircraft and/or jacking assembly. In addition, it is desirable to provide a jacking assembly that includes an adapter that reduces the risks of side loading. Furthermore, other desirable features and characteristics will become apparent from the subsequent summary and detailed description and the appended claims, taken in conjunction with the accompanying drawings and the foregoing technical field and background.

BRIEF SUMMARY

An aircraft lifting assembly, an adapter for an aircraft lifting assembly, and a method of lifting an aircraft are disclosed herein.

In a first non-limiting embodiment, an aircraft lifting assembly includes a jack, a load cell, and a jack adapter. The jack includes an extendable arm having a distal end portion for exerting a force to lift an object. The distal end portion defines a cavity. The load cell is capable of measuring a weight supported by the jack during an aircraft lifting operation. The jack adapter couples the extendable arm to the load cell and includes a base portion, a cradle portion, and a projection. The base portion defines a jack arm support surface and a load cell support surface. The jack arm support surface opposes the distal end portion of the extendable arm and the load cell support surface opposes the load cell. The cradle portion extends from the base portion to circumscribe a portion of the load cell to secure the jack adapter to the load cell. The projection extends from the base portion into the cavity of the distal end portion of the extendable arm of the jack to secure the jack adapter to the extendable arm of the jack.

In another non-limiting embodiment, an adapter is for connecting an extendable arm of a jack to a load cell for aircraft lifting operations. The jack includes an extendable arm having a distal end portion defining a cavity. The load cell is capable of measuring a weight supported by the jack during an aircraft lifting operation. The adapter includes a base portion, a cradle portion, and a projection. The base portion defines a jack arm support surface and a load cell support surface. The jack arm support surface is configured to oppose the distal end portion of the extendable arm and the load cell support surface configured to oppose the load cell. The cradle portion extends from the base portion and is configured to circumscribe a portion of the load cell to secure the adapter to the load cell. The projection extends from the base portion to insert into the cavity of the distal portion of the extendable arm of the jack and secure the adapter to the extendable arm of the jack.

In another non-limiting embodiment, a method is for jacking an aircraft with a jack and a load cell, the jack including an extendable arm, the extendable arm having a distal end portion for exerting a force to lift an object, the distal end portion defining a cavity, the load cell capable of measuring a weight supported by the jack during an aircraft lifting operation. The method includes inserting a projection of a jack adapter into the cavity of the extendable arm to couple the extendable arm to the load cell. The method further includes positioning a base portion of the jack adapter such that a jack arm support surface of the base portion opposes the distal end portion of the extendable arm. The method further yet includes positioning the load cell into a cradle portion of the jack adapter that extends from the base portion, the positioning of the load cell such that the cradle portion circumscribes a portion of the load cell to secure the jack adapter to the load cell.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

An improved aircraft lifting assembly is disclosed herein. In a non-limiting embodiment, the aircraft lifting assembly includes a load cell adapter that nests into main wing aircraft jacks and nose aircraft jacks. When a male section of the load cell adapter is installed into a cavity on the jack, a locking pin may be installed through the jack and the male section of the load cell adapter to further protect against adapter displacement from the jack. The load cell adapter holds and cradles load cells for weight and balance procedures. A cutout notch may be included to accommodate load cell communication and/or power plugs. In some embodiments, the load cell adapter is circular, cup shaped, and wraps around the entire load cell using a wide base to protect against tipping of the load cell.

A greater understanding of the aircraft lifting assembly, the load cell adapter, and a method of lifting an aircraft may be obtained through a review of the illustrations accompanying this application together with a review of the detailed description that follows.

Figure 1:
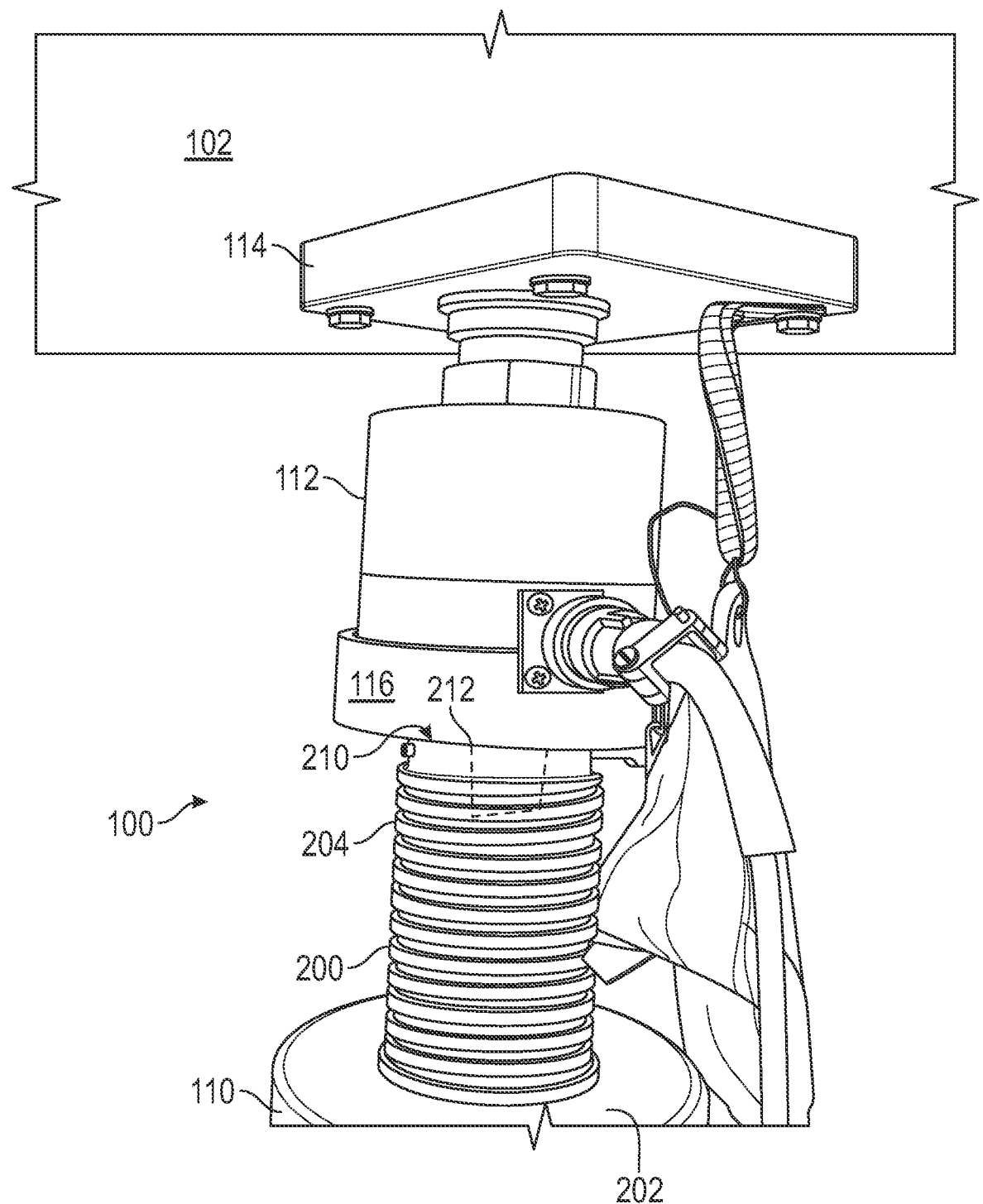
FIGS. 1-2 are perspective views of an aircraft lifting assembly in accordance with some embodiments of the present disclosure.
Figure 2:
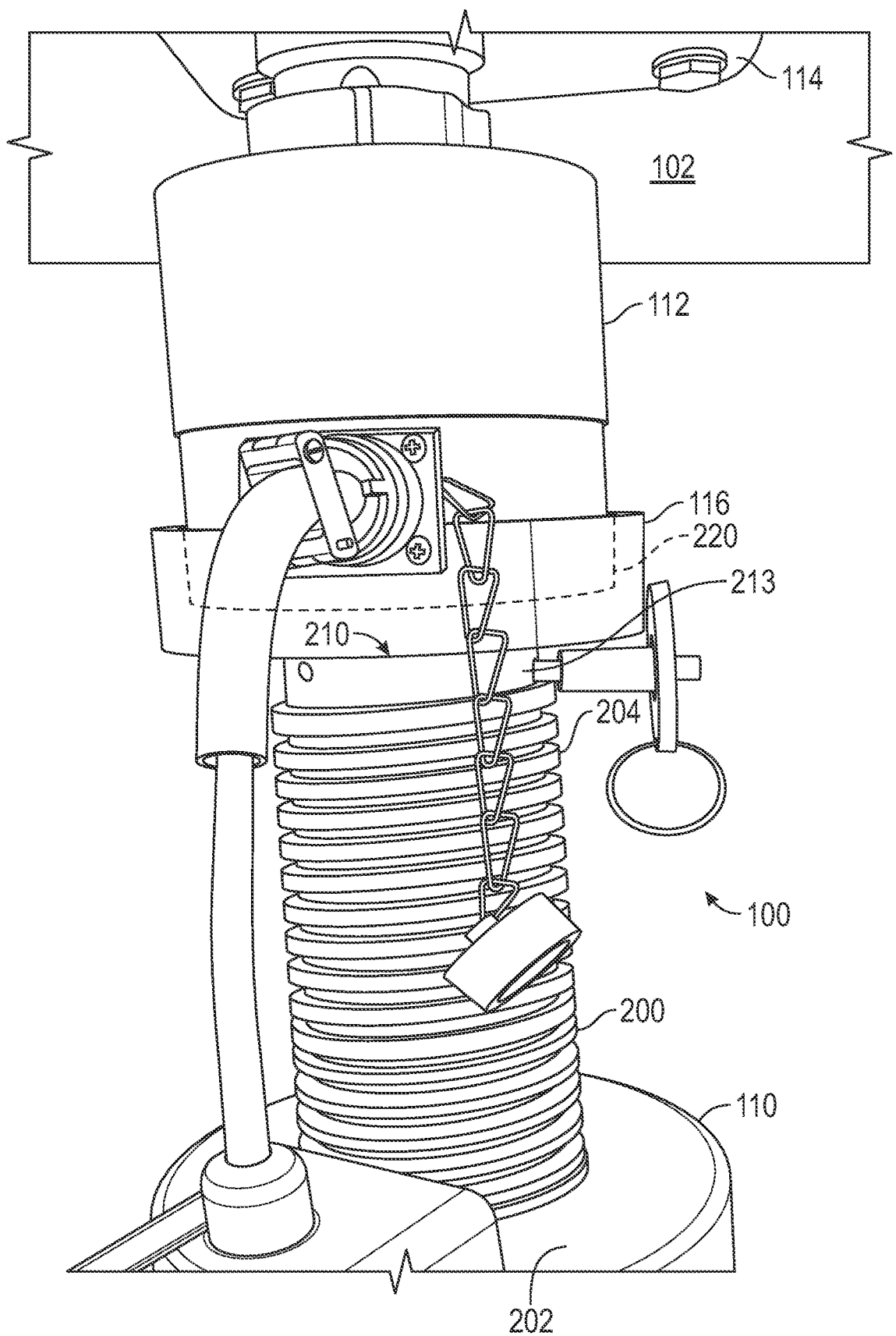

FIGS. 1-2 are side views illustrating an aircraft lifting assembly 100 in use on an aircraft 102. Aircraft 102 may comprise any type of aircraft including, without limitation, a subsonic aircraft, a supersonic aircraft, a propeller driven aircraft, a jet powered aircraft, a commercial airliner, a private business jet, a cargo aircraft, a military aircraft, and any other type of aircraft in which it is desirable to lift a stationary aircraft off the ground for maintenance or inspection purposes. Additionally, although the lifting assembly of the present disclosure is being described and explained in the context of its application for lifting an aircraft, it should be understood that the lifting assembly of the present disclosure is not limited to lifting aircraft. Rather, the lifting assembly of the present disclosure may be used on any type of vehicle including, but not limited to, automotive vehicles, surface and sub-surface watercraft, and spacecraft. Furthermore, the lifting assembly is not limited to use in vehicles and may be employed in other applications unrelated to vehicles such as, and without limitation, in the construction and manufacturing industries. In still other applications, the lifting assembly of the present disclosure may be employed in any industry and/or application where it is desirable to lift heavy objects while measuring the force applied to the object.

The aircraft 102 has a plurality of jacking positions designated by the manufacturer of the aircraft 102. FIGS. 1-2 illustrate the lifting assembly 100 in use on a main wing lifting position for inspection and maintenance operations. It should be appreciated that the lifting assembly 100 may be used in any suitable lifting position or other suitable lifting location without departing from the scope of the present disclosure.

The aircraft lifting assembly 100 is used between a ground or other support surface and the aircraft 102 for jacking the stationary aircraft 102 during maintenance and inspection procedures. The aircraft lifting assembly 100 includes a jack 110, a load cell 112, a load support plate 114, and a load cell jack adapter 116. Additional or fewer components may be included in any particular implementation without departing from the scope of the present disclosure.

The jack 110 is a mechanical lifting device used to apply great forces or lift heavy loads. In the example provided, the jack 110 is a screw jack. Other jack types may be used without departing from the scope of the present disclosure. The jack 110 includes an extendable arm 200 that protrudes from a jack base 202.

The extendable arm 200 translates into and out of the base 202 during operation. The extendable arm 200 has a distal end portion 204 for exerting a force to lift an object. For example, as the extendable arm 200 translates out of the base 202, the weight of the object presses on the distal end portion 204. The lifting assembly 100 resists and lifts the weight by transferring lifting forces from the ground surface to the base 202, from the base 202 to the extendable arm 200, from the distal end portion 204 to the jack adapter 116, from the jack adapter 116 to the load cell 112, from the load cell 112 to the load support plate 114, and from the load support plate 114 to the aircraft 102.

The distal end portion 204 defines a top surface 210, a cavity 212, and a jack arm pin aperture 213. The top surface 210 opposes a jack arm support surface of the jack, as will be described below. In the example provided, the top surface 210 is flat and level when the base 202 is level. The cavity 212 has cavity walls that are cylindrical and coaxial with an outer surface of the extendable arm. It should be appreciated that the cavity 212 may have other shapes without departing from the scope of the present disclosure. The jack arm pin aperture 213 is a bore hole through which a locking pin may be inserted, as will be described below.

The load cell 112 is a weight measuring device that is capable of measuring a weight supported by the jack 110 during an aircraft lifting operation. In the example provided, the load cell 112 has a cylindrical shape with a diameter that is larger than the diameter of the extendable arm 200. The load cell 112 defines a bottom surface 220 opposing a load cell support surface of the jack adapter that will be described below.

The load support plate 114 couples with the load cell and contacts the aircraft 102. The load support plate 114 distributes the force of lifting the aircraft 102 according to the design of the jacking position. For example, the load support plate 114 may have a contoured support surface that matches a shape of the aircraft 102 and distributes weight across an area that is selected based on a safe loading pressure at the jacking position.

Figure 3:
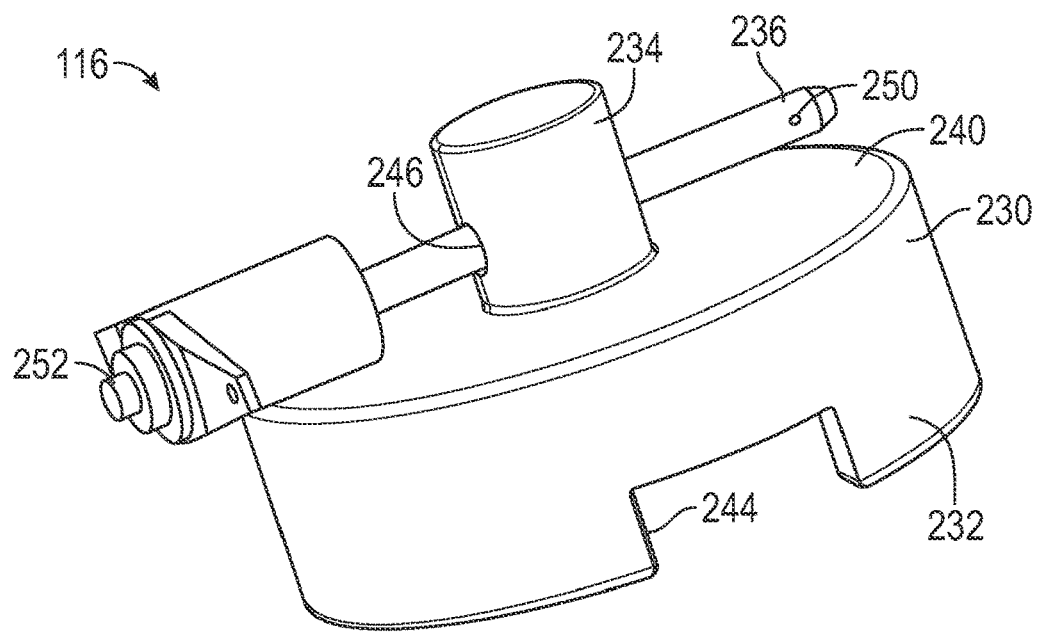
FIGS. 3-4 are perspective views of a load cell adapter of the aircraft lifting assembly illustrated in FIGS. 1-2.
Figure 4:
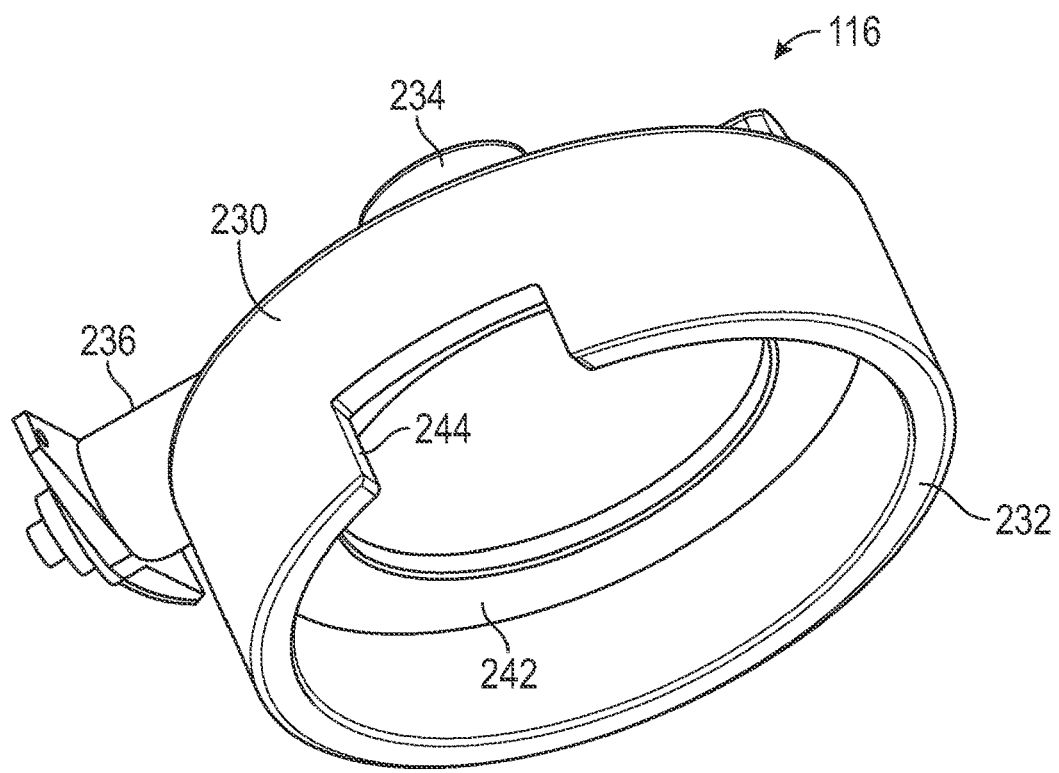

Referring now to FIGS. 2-3, and with continued reference to FIGS. 1-2, the load cell jack adapter 116 is illustrated in perspective views in accordance with some embodiments of the present disclosure. The load cell jack adapter 116 secures the load cell 112 to the extendable arm 200 to reduce a risk of tipping or side loading of the lifting assembly 100.

The jack adapter 116 includes a base portion 230, a cradle portion 232, a projection 234, and a locking pin 236. In some embodiments, the base portion 230, the cradle portion 232, and the projection 234 are monolithic pieces of metal. For example, the base portion 230, the cradle portion 232, and the projection 234 may be machined from a single piece of steel or aluminum stock on a mill or lathe.

The base portion 230 is disposed between the cradle portion 232 and the projection 234 and defines a jack arm support surface 240 and a load cell support surface 242. The jack arm support surface 240 opposes the distal end portion 204 of the extendable arm 200. The jack arm support surface 240 is larger than the top surface of the distal end 204 of the extendable arm 200 of the jack. Accordingly, the load from the aircraft 102 is distributed across substantially the entire top surface of the distal end 204 and pressures are minimized. Additionally, the large jack arm support surface 240 provides a wide base to restrict tipping of the jack adapter 116 off of the extendable arm 200.

The load cell support surface 242 opposes the load cell 112. The load cell support surface 242 is larger than the bottom surface of the load cell 112. Accordingly, the load from the aircraft 102 is distributed across substantially the entire bottom surface of the load cell 112 to the base portion 230 of the jack adapter 116. Additionally, the wide base of the load cell support surface 242 restricts tipping of the load cell 112 off of the jack adapter 116.

The cradle portion 232 extends away from the base portion 230 to circumscribe a portion of the load cell 112 and secure the jack adapter 116 to the load cell 112. In the example provided, the cradle portion 232 is a wall portion that defines an electrical connector pass-through portion 244 configured to permit an electrical connection to the load cell 112.

The cradle portion 232 has a cradle shape that is based on the load cell shape of the load cell 112. For example, the walls of the cradle portion 232 may have a cylindrical inner surface that is shaped substantially the same as an outer surface of the load cell 112 is shaped. As used herein, the term "substantially the same as" means that the walls are larger by an amount that permits easy insertion of the load cell 112 after accounting for manufacturing tolerances.

The projection 234 extends from the jack arm support surface 240 of the base portion 230 into the cavity 212 of the distal end portion 204 of the extendable arm 200 of the jack 110 to secure the jack adapter 116 to the extendable arm 200 of the jack 110.

The projection 234 has a projection shape that is based on a cavity shape of the cavity 212. For example, the cavity 212 and the projection 234 may have similar circular profiles, square profiles, or profiles of any other suitable shape that are substantially the same size. In the example provided, the projection shape is substantially the same as the cavity shape.

The projection 234 defines a projection pin aperture 246 through which the locking pin 236 may be inserted. Projection pin aperture 246 is a bore hole that extends through the projection 234 perpendicular to a longitudinal direction of the projection 234.

The locking pin 236 may be inserted to extend through the jack arm pin aperture 213 and through the projection pin aperture 246 to restrict rotation of the jack adapter 116 within the extendable arm 200 of the jack 110. The locking pin 236 includes a locking feature 250 that is released by a release button 252 on a handle of the locking pin 236. For example, the locking feature 250 may be a ball bearing biased outwards by a mechanism that ceases to bias the ball bearing in response to depression of the release button 252.

Figure 5:
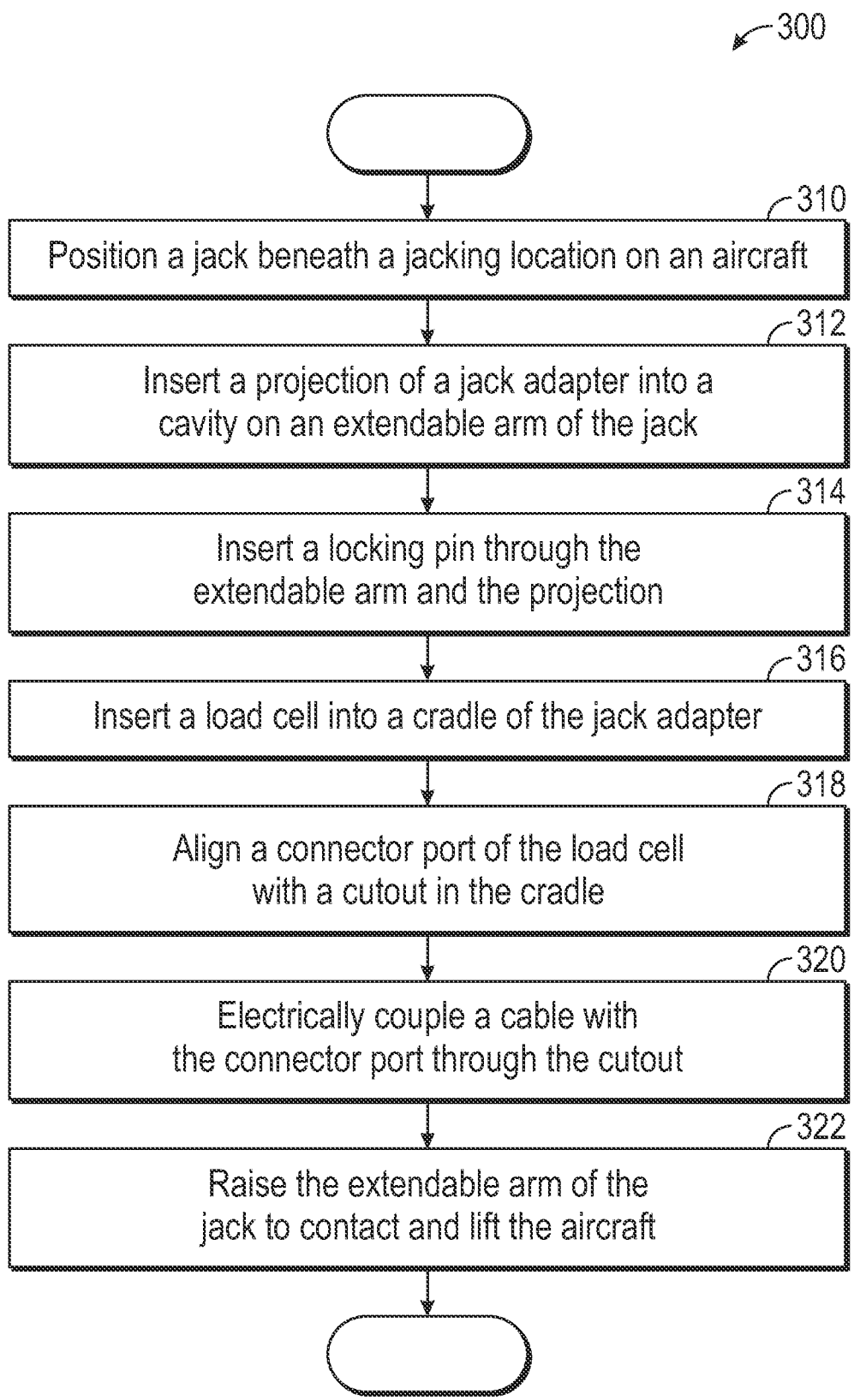
FIG. 5 is a flow diagram illustrating a non-limiting embodiment of a method of jacking an aircraft using a jack and a load cell in accordance with the teachings disclosed herein.

Referring now to FIG. 5, and with continued reference to FIGS. 1-4, a method 300 of jacking an aircraft with a jack and a load cell is illustrated in flow diagram form. The sequence of tasks illustrated and described below may be changed without departing from the scope of the present disclosure. For example, the jack adapter may be assembled with the jack and the load cell before positioning the assembly beneath a jacking position.

Task 310 positions a jack beneath a jacking location on an aircraft. The jack includes an extendable arm. The extendable arm has a distal end portion for exerting a force to lift an object. The distal end portion defining a cavity. The load cell is capable of measuring a weight supported by the jack during an aircraft lifting operation. For example, task 210 may position the jack 110 and the load cell 112 beneath the aircraft 102.

Task 312 inserts a projection of a jack adapter into a cavity on an extendable arm of the jack. For example, task 312 may insert projection 234 into cavity 212 of extendable arm 200 of the jack 110.

Task 314 inserts a locking pin through the extendable arm and the projection. For example, task 314 may insert the locking pin 236 through the jack arm pin aperture 213 and through the projection pin aperture 246 to restrict rotation of the jack adapter 116 within the extendable arm 200 of the jack 110.

Task 316 inserts a load cell into a cradle of the jack adapter. For example, task 316 may insert load cell 112 into cradle portion 232 of jack adapter 116.

Task 318 aligns a connector port of the load cell with a cutout in the cradle. For example, task 318 may align pass-through portion 244 of jack adapter 116 with an electrical connection port of the load cell 112. Task 320 electrically couples a cable with the connector port through the cutout. For example, the cable may be inserted into the connection port of the load cell 112 through the pass-through portion 244.

Task 322 raises the extendable arm of the jack to contact and lift the aircraft. For example, task 322 may operate the jack 110 to lift the aircraft 102.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. An aircraft lifting assembly, comprising:
a jack including an extendable arm, the extendable arm having a distal end portion for exerting a force to lift an object, the distal end portion having a cavity formed therein;
a load cell capable of measuring a weight supported by the jack during an aircraft lifting operation; and
a jack adapter for coupling the extendable arm to the load cell, the jack adapter comprising:
a base portion defining a jack arm support surface on a first side of the base portion, and a load cell support surface on a second side of the base portion that is opposite the first side of the base portion, wherein the jack arm support surface opposes the distal end portion of the extendable arm and the load cell support surface opposes the load cell;
a cradle portion extending above the base portion to circumscribe a portion of the load cell to secure the jack adapter to the load cell; and
a projection of the base portion extending below the first side of the base portion into the cavity of the distal end portion of the extendable arm of the jack to secure the jack adapter to the extendable arm of the jack.

2. The aircraft lifting assembly of claim 1, wherein the projection of the jack adapter includes a projection pin bore hole formed therein and the distal end portion of the extendable arm includes a jack arm pin bore hole formed therein, and the jack adapter further comprising a locking pin extending through the jack arm pin bore hole and through the projection pin bore hole to restrict rotation of the jack adapter within the extendable arm of the jack.

3. The aircraft lifting assembly of claim 1, wherein the cradle portion includes a wall portion and defines an electrical connector pass-through portion configured to permit an electrical connection to the load cell.

4. The aircraft lifting assembly of claim 1, wherein:
the load cell defines a bottom surface opposing the load cell support surface of the jack adapter;
the distal end portion defines a top surface opposing the jack arm support surface of the jack adapter;

the load cell support surface of the adapter is larger than the bottom surface of the load cell; and the jack arm support surface of the adapter is larger than the top surface of the distal end of the extendable arm of the jack.

5. The aircraft lifting assembly of claim 1, wherein the distal end portion defines the cavity at least partially with cavity walls that are cylindrical and coaxial with the extendable arm.

6. The aircraft lifting assembly of claim 1, wherein the projection has a projection shape that is based on a cavity shape of the cavity.

7. The aircraft lifting assembly of claim 6, wherein the projection shape is substantially the same as the cavity shape.

8. The aircraft lifting assembly of claim 1, wherein the cradle portion has a cradle shape that is based on a load cell shape of the load cell.

9. The aircraft lifting assembly of claim 8, wherein the cradle shape is substantially the same as the load cell shape.

10. An adapter for connecting an extendable arm of a jack to a load cell for aircraft lifting operations, the jack including an extendable arm having a distal end portion having a cavity formed therein, the load cell capable of measuring a weight supported by the jack during an aircraft lifting operation, the adapter comprising:

a base portion defining a jack arm support surface on a first side of the base portion, and a load cell support surface on a second side of the base portion that is opposite the first side of the base portion, the jack arm support surface configured to oppose the distal end portion of the extendable arm and the load cell support surface configured to oppose the load cell;

a cradle portion extending above the base portion and configured to circumscribe a portion of the load cell to secure the adapter to the load cell; and a projection of the base portion extending below the first side of the base portion to insert into the cavity of the distal portion of the extendable arm of the jack and secure the adapter to the extendable arm of the jack.

11. The adapter of claim 10, wherein the projection of the adapter includes a projection pin bore hole formed therein, the adapter further comprising a locking pin configured to extend through the projection pin aperture and through a jack arm pin bore hole formed in the extendable arm to restrict rotation of the adapter within the extendable arm of the jack.

12. The adapter of claim 11, wherein the cradle portion includes a wall portion and defines an electrical connector pass-through portion configured to permit an electrical connection to the load cell.

13. The adapter of claim 12, wherein:

the load cell support surface of the adapter is larger than a bottom surface of the load cell; and the jack arm support surface of the adapter is larger than the top surface of the distal end of the extendable arm of the jack.

14. The adapter of claim 13, wherein the projection has a projection shape that is based on a cavity shape of the cavity.

15. The adapter of claim 14, wherein the projection shape is substantially the same as the cavity shape.

16. The adapter of claim 15, wherein the cradle portion has a cradle shape that is based on a load cell shape of the load cell.

17. The adapter of claim 16, wherein the cradle shape is substantially the same as the load cell shape.

* * * * *